UNITED STATES PATENT OFFICE.

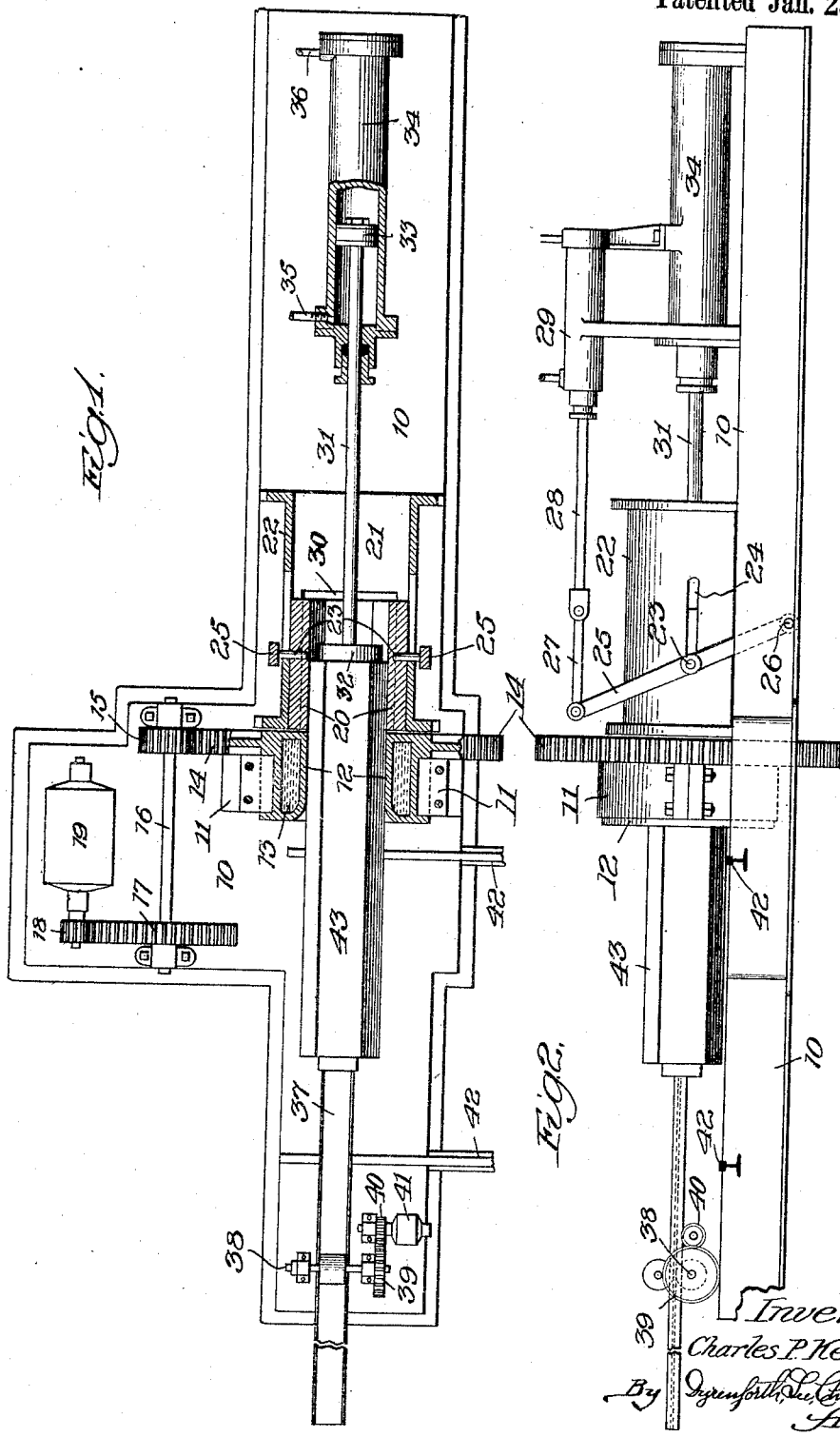

CHARLES P. KEMBLE, OF CHICAGO, ILLINOIS, ASSIGNOR OF ONE-HALF TO ABNER C. HARDING, OF CHICAGO, ILLINOIS.

SEVERING BLOOMS.

1,366,693.      Specification of Letters Patent.      Patented Jan. 25, 1921.

Application filed October 18, 1919. Serial No. 331,644.

*To all whom it may concern:*

Be it known that I, CHARLES P. KEMBLE, a citizen of the United States, residing at 1213 E. 65th street, Chicago, in the county of Cook and State of Illinois, have invented a new and useful Improvement in Severing Blooms, of which the following is a specification.

This invention relates to an improvement in severing blooms and is fully described in the following specification and shown in the drawings in which Figure 1 is a plan view partly in horizontal section and Fig. 2 is a side elevation.

I have illustrated as an embodiment of my invention a torsional shearing mechanism which is particularly adapted for twisting off sections of large octagonal blooms as they come from the blooming rolls and while hot. These sections are used particularly in the manufacture of car wheels and the like. For this purpose the sections are reheated, placed on end in a die under a hydraulic press and forged to the desired shape. By the usual method at present in use for cutting these sections, a central projection is formed which is difficult and expensive to remove and which results in imperfect forgings due to the fact that it is forced out over the face of the forging but does not become welded thereto. During machining this piece often falls out and the entire forging is discarded.

My torsional machine comprises a base 10 upon which is journaled in a bearing 11, a hollow movable chuck 12 which is preferably provided with a water jacket 13 and which has a ball gear 14 formed on its cutting face. This gear meshes with the pinion 15 which is keyed on the shaft 16 which is journaled in bearings carried by the base 10. A spur gear 17 keyed to the shaft 16 meshes with the pinion 18 which is keyed to the armature shaft of the motor 19.

Facing the movable chuck 12 is a hollow relatively stationary chuck 20 which is slidably mounted in the guideway 21 but is prevented from turning by the sides 22. Pins 23 secured to the stationary chuck 20 extend through slots 24 in the sides 22 and are pivotally mounted in levers 25 pivoted at their lower ends at 26. The upper ends of these levers are suitably connected by means of a connecting rod 27 with the piston rod 28 which is connected to a piston operable in the water cylinder 29. An opening 30 is provided beneath the chuck 20 and in the guiding 21.

A piston rod 31 having a head 32 acting as a gage is connected to a piston 33 slidable in a water cylinder 34. Pipes 35 and 36 admit water to this cylinder and are under control of the operator.

A push bar 37 has a rack formed on the under side which meshes with a pinion on the shaft 38 which has a gear 39 keyed thereon. This meshes with a pinion 40 on the armature shaft of the motor 41. Skids 42 are provided for conveying the bloom 43 from the blooming mill.

The operation of my machine is as follows:—The clutch 20 is forced to the position shown in Fig. 1 by pressure applied in the cylinder 29. The gear 14 is then turned so as to bring the openings in the chucks 12 and 20 into registration. These openings are preferably octagonal to accommodate an octagonal bloom 43, and are just large enough to allow it to slide through. The gage 32 is set to the desired distance from the adjoining ends of the two chucks to cut a section of the desired length.

A hot bloom preferably direct from the blooming mills is brought in on the skids 42 and placed in axial alinement with the chucks 12 and 20 and the push rod 37. This push rod is then actuated forcing the bloom endwise until it strikes the gage 32. The motor 19 is then set in motion turning the gear 14, the chuck 12 and the left hand end of the bloom 43. So much of the right hand end as lies within the chuck 20 will be severed but several turns may be required to complete the break.

The gage is held solidly against one end of the bloom and the push bar against the other. As the severing action begins, the metal at the plane of severance necks down and tends to press the parts of the bloom apart. Resistance to this movement is met in the push bar and gage and the result is that the two sections are pressed together, producing a sharper, cleaner break than would otherwise occur.

As soon as the end is completely detached the chuck 20 is withdrawn so that the opening 30 is uncovered. The gage 32 is also drawn back somewhat and the severed end falls through the opening 30 and is conveyed in any desired way to a place of storage.

The various parts are then reset and the operation proceeds as before.

While I have shown and described but a single embodiment of my invention, it is to be understood that it is capable of many modifications. Changes therefore in the construction and arrangement may be made without departing from the spirit and scope of the invention as disclosed in the appended claim.

What I claim as new and desire to secure by Letters Patent is:

The method of severing blooms consisting of pushing a hot bloom endwise a fixed distance through adjacent alining gripping elements, applying pressure to the ends of the bloom, and rotating one of said elements with respect to the other.

CHARLES P. KEMBLE.